May 19, 1964     W. C. CONKLING     3,133,440
STABILIZING APPARATUS FOR FLOATS FOR VARIABLE FLOW METERS
Filed Sept. 14, 1960
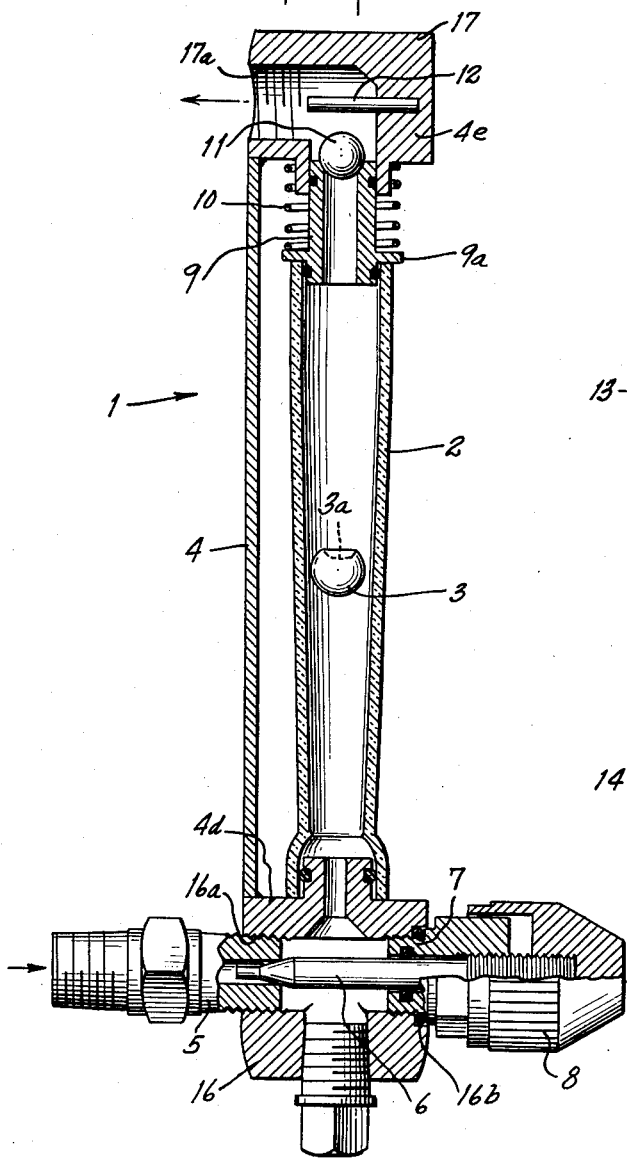
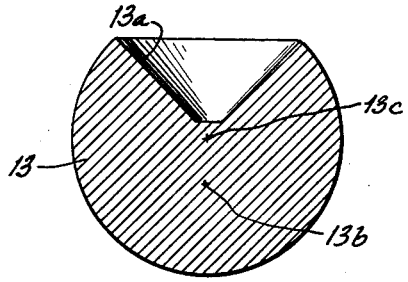
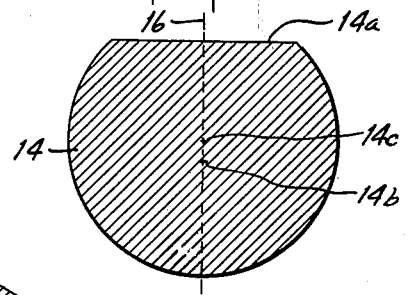
INVENTOR.
WILLIAM C. CONKLING
BY
ATTORNEY 3,133,440
STABILIZING APPARATUS FOR FLOATS FOR
VARIABLE FLOW METERS
William C. Conkling, Essex Fells, N.J., assignor to Wallace & Tiernan Incorporated, Belleville, N.J., a corporation of Delaware
Filed Sept. 14, 1960, Ser. No. 55,879
4 Claims. (Cl. 73—209)

This invention relates to variable restriction flow meters, and especially to floats for such meters which are stabilized against oscillation, particularly horizontal oscillation.

A variable restriction flow meter of the type concerned herein is a fluid flow measuring device comprising a vertically extending passage for the upward flow of fluid to be measured, and a float which rides in the stream of fluid within the vertical passage. The present invention is concerned with meters using elongated vertically extending tapered passages in which the floats move. The cross-sectional area of the passage which is open to the flow of fluid is increased as the float moves upwardly and decreased as the float moves downwardly. For a given fluid being metered, the vertical position of the float may be taken as a measure of the rate of fluid flow. Various indicating mechanisms are employed so that the vertical position of the float may be measured.

Spherical floats are commonly used in meters of the tapered tube type, since a spherical float is simple and inexpensive to make accurately, and has a useful degree of stability in many flow measuring situations. It has been found, however, that such floats are sometimes unstable and oscillate either horizontally or vertically. Various types of guide structures have been proposed to eliminate horizontal oscillations.

Various factors are known to contribute to the presence of horizontal oscillations. One such factor is the ratio of the inside diameter of the tube to the diameter of the float. For example, where that ratio is 1:30, oscillations are likely, whereas they are not encountered as frequently where that ratio is 1:15. A tube with a wide angle of taper (such as may be used when the tube is relatively short, e.g., 3 inches) is more susceptible to oscillations than a tube with a narrow angle of taper (such as may be used in a 5 inch tube). Floats having larger diameters are more likely to oscillate than floats having smaller diameters. For example, a meter having a float with a 5/16 inch diameter oscillates more than a smaller capacity meter having a float with a 3/16 inch diameter, it being understood that the meters are otherwise equivalent, that is to say, the tubes are of the same length and the ratio of diameter of tube to diameter of float is the same at any level in both tubes.

Horizontal or lateral oscillation may appear as complex linear horizontal motions under some conditions, whereas under other conditions it may appear as a rapid rolling of the float around the inside surface of the tube. In either case, it may produce wear on the float and tube, resulting in inaccuracy of the meter. Furthermore, an error is introduced by a change in position of the float from its normal quiescent position. The float tends to climb higher in the tube, thereby indicating a flow greater than that actually taking place. This climbing tendency may in part be due to the upward component of force on the float as it rolls on or collides with a tapered wall of the tube.

This oscillation problem has commonly been solved in the prior art by using some form of guide for the float. For example, it has been proposed to use tubes having internal ribs or triangular cross-sectional configurations. It has also been proposed to provide a fixed vertical rod at the center of the tube and to provide an aperture in the float so that it may slide vertically on the rod. Such solutions increase the complication of the meter and may also introduce friction, which tends to introduce errors into the flow measurements.

An object of the present invention is to provide an improved variable restriction fluid flow meter of the tapered tube type, in which the float is stabilized against oscillation.

Another object of the invention is to provide an improved stable float structure for use in a tapered tube fluid flow meter.

Another object is to provide a stable float structure for such a meter, in the form of a modified sphere.

The foregoing objects are attained in the structures herein described. The float is modified from a true sphere by a removal of material from at least one locality on the surface of the sphere. The center of gravity of the float is displaced thereby from the geometrical center of the original spherical body. Such a float resists the establishment of oscillatory motion and tends to damp out any oscillation which may become established.

Other objects and advantages of the invention will become apparent from a consideration of the following specification and claims, taken together with the accompanying drawing.

In the drawing:

FIG. 1 is a vertical cross-sectional view through a meter embodying the invention;

FIG. 2 is a vertical cross-sectional view through a modified form of meter float embodying the invention; and FIG. 3 is a vertical cross-sectional view through another modified form of meter float embodying the invention.

FIG. 1 illustrates a meter of the tapered tube type, generally indicated at 1. Its principal elements are a tapered tube 2 and a float 3.

The structure of the meter, except for the float 3 is conventional, and will be only briefly described. The meter 1 comprises a vertical elongated frame 4 connecting a lower end fitting 16 and an upper end fitting 17. The frame 4 may be a stamping and the end fittings may be screw machine parts, desirably of stainless steel. The frame is preferably welded to the end fittings. The lower end fitting 16 has an inlet passage 16a formed therein. The upper end fitting 17 has an outlet passage 17a formed therein. A fitting 5 which also serves as a seat for a valve 6 is threaded into the inlet passage 16a. The stem of valve 6 extends through a sleeve 7 threadedly inserted in a passage 16b in the fitting 16. The outer end of the stem of valve 6 is threaded in the sleeve 7 and is rotatable therein by means of a knurled handle 8.

The tapered tube 2 has its lower end abutting the base end fitting 16. The upper end of the tube 2 abuts a metering tube adapter 9 which is slidable within a vertical passage in the upper end fitting 17. A spring 10 biases the adapter 9 downwardly so that an external flange 9a near its lower end abuts the upper end of the tube 2. A ball check valve 11 is located at the upper end of the adapter 9. A stop pin 12 prevents the ball valve 11 from passing out through the passage 17a.

The float 3 has its upper surface recessed as shown at 3a.

Other forms of floats constructed in accordance with the invention are shown at 13 in FIG. 2 and at 14 in FIG. 3.

The float 13 of FIG. 2 has the general form of a sphere with a truncated conical recess 13a formed by some convenient means such as a drill.

The structure shown in FIG. 3 is simpler, being a sphere flattened on one side by the removal of material so as to form a plane 14a. In order to secure substantial improvement in stability, it has been found necessary to remove material sufficient to reduce the distance from the center of the sphere to the plane to no more than three-fourths of the radius of the sphere.

The particular contour of the material removed from the sphere (and hence the contour of the material remaining) is only a matter of convenience with respect to the removal operation. The only limitation is that the remaining surface must be more than one hemisphere. By making the float body substantially greater than a hemisphere, as described, a substantial tilting of the float may take place without changing the area of the annular orifice open to the flow of fluid. By the removal of material asymmetrically from the sphere, the center of gravity of the resulting body is moved from the geometrical center 13c of the original sphere.

It may be seen that a float, contoured as described above, and supported by an upwardly moving column of liquid, will tend to float in a stable orientation with the lightened side upward.

When the float is in the upright position described above, and shown in FIGS. 2 and 3, the geometrical center of the silhouette of the float, projected on a vertical plane, is not horizontally aligned with the center of gravity of the float body. The mass of the float is, by convention, considered as concentrated at its center of gravity. Hence, any effective force (product of mass times acceleration) corresponding to a horizontal acceleration of the body, may be considered as acting horizontally through its center of gravity. On the other hand, the fluid resistance to the sidewise motion acts horizontally through the geometrical center of the silhouette.

By the modification of the float structure from a true sphere, the perfect symmetry of the sphere has been disturbed. This lack of symmetry exists not only in the external shape of the float, but also in the displacement of the center of gravity from the center of the original sphere.

When a conventional float oscillates, it tends to move resonantly, at a particular frequency. A float constructed in accordance with the present invention has a lack of symmetry which introduces random movements and forces effectively opposing the forces that tend to sustain the oscillation, thereby effectively damping the oscillation.

There are numerous variables concerned in an oscillation or attempted oscillation of a float constructed in accordance with the invention, in a flow meter. While some theoretical aspects of such an oscillation are discussed herein, it is not pretended that the theoretical discussion is complete. The present invention is not limited to any such theory, but is directed to a particular float structure which damps oscillations, regardless of the theory by which the oscillations, and the damping action, may be explained.

By using a set of floats of equal diameter but of different weights, due to removal of different amounts of material, in accordance with the present invention, a single tapered tube may be adapted to measure different maximum and minimum flows.

While I have shown and described certain preferred embodiments of my invention, it will be readily understood by those skilled in the art that various modifications thereof can be made. I therefore intend my invention to be limited only by the appended claims.

I claim:

1. A solid float for a variable restriction area flow meter having a spherical contour except for truncation by a flat plane so that the distance from the sphere center to the center of the plane is no greater than three-fourths of the sphere radius.

2. A float for a variable restriction flow meter of the tapered passage type, comprising a solid body whose surface consists of a spherical portion and a non-spherical portion, said spherical portion being continuous and substantially greater than a hemisphere, said non-spherical portion having all parts of its surface spaced from the center of the spherical portion by distances less than the radius of the spherical portion.

3. A float as defined in claim 2, in which said non-spherical portion defines a single continuous recess in the surface of the body, said recess having the form of a truncated right circular cone with its larger base forming an edge of the spherical portion of the body and with its axis aligned with a radius of said spherical portion.

4. A variable restriction flow meter, comprising:
   (a) a vertically extending tube having an inside diameter tapering from a large dimension at the top to a smaller dimension at the bottom;
   (b) a fluid inlet connection at the bottom of the tube;
   (c) a fluid outlet connection at the top of the tube; and
   (d) a float within the tube and guided only by the tube and by the flowing fluid, said float comprising an integral body having a surface consisting of a spherical portion and a non-spherical portion, said spherical portion being continuous and substantially greater than a hemisphere, said non-spherical portion having all parts of its surface spaced from the center of the spherical portion by distances less than the radius of the spherical portion, said float being of smaller diameter than the tube and tending to assume a stable orientation wherein said non-spherical portion of its surface is uppermost, said spherical portion of the float allowing substantial tilting of the float from its stable orientation without introducing a variation in the open cross-sectional area between the float and the tube due to said tilting.

References Cited in the file of this patent

UNITED STATES PATENTS

| | | |
|---|---|---|
| 1,889,705 | Sherwood | Nov. 29, 1932 |
| 1,899,764 | Machlet | Feb. 28, 1933 |
| 2,339,922 | Gatewood | Jan. 25, 1944 |
| 2,451,460 | Winton | Oct. 19, 1948 |

FOREIGN PATENTS

| | | |
|---|---|---|
| 573,359 | Germany | Mar. 30, 1933 |
| 644,975 | Great Britain | Oct. 18, 1950 |